Jan. 17, 1956
W. R. LINDSAY
2,731,233
PIPE PULLER
Filed May 29, 1953
3 Sheets-Sheet 1
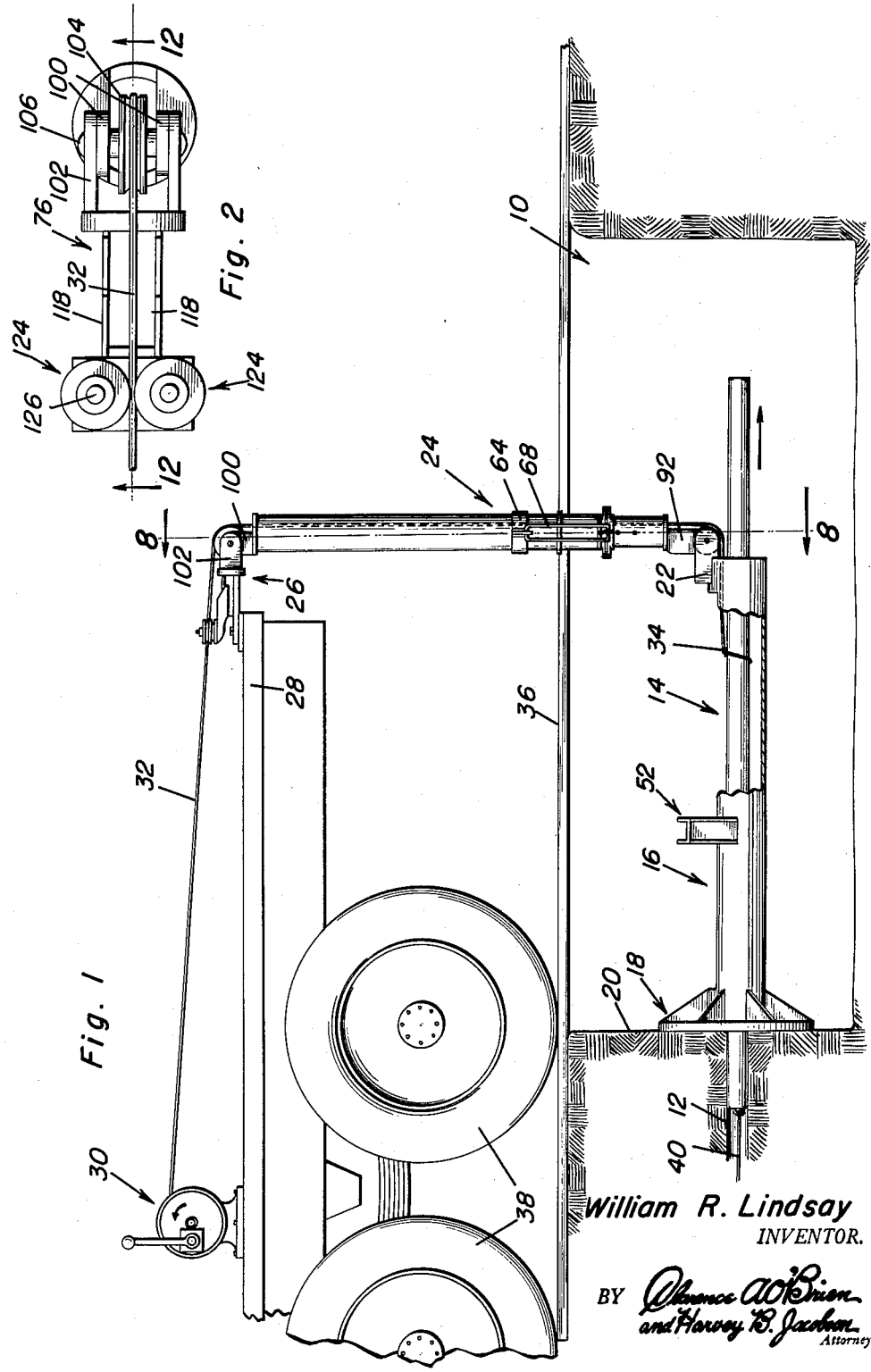
William R. Lindsay
INVENTOR.

Jan. 17, 1956  W. R. LINDSAY  2,731,233
PIPE PULLER
Filed May 29, 1953  3 Sheets-Sheet 2
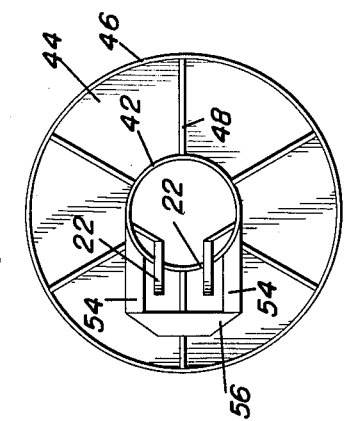
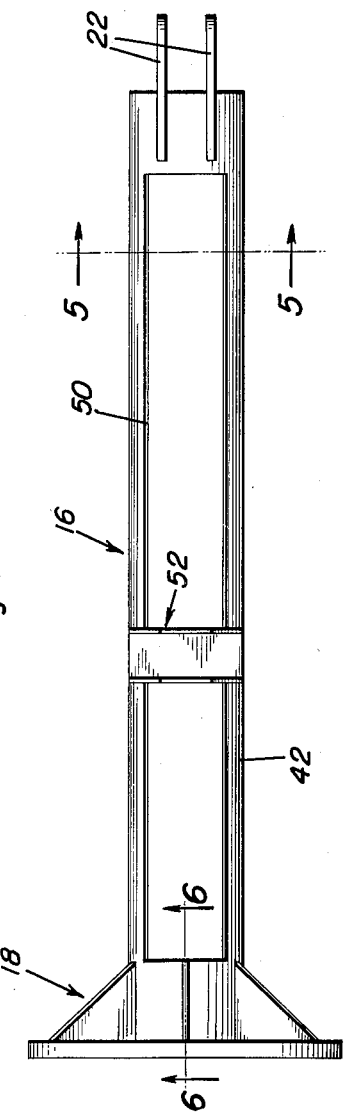
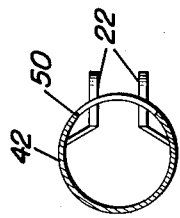
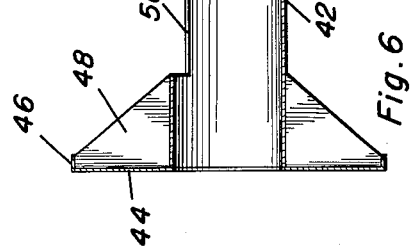
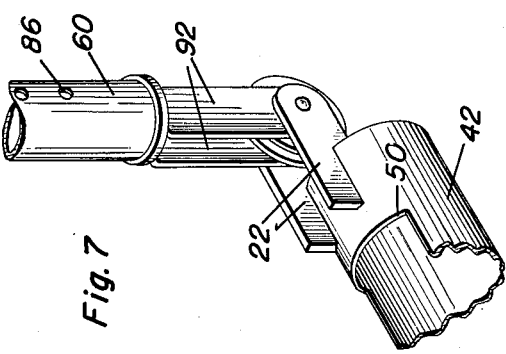
William R. Lindsay
INVENTOR.
BY *Clarence A. O'Brien*
and *Harvey B. Jacobson*
Attorneys

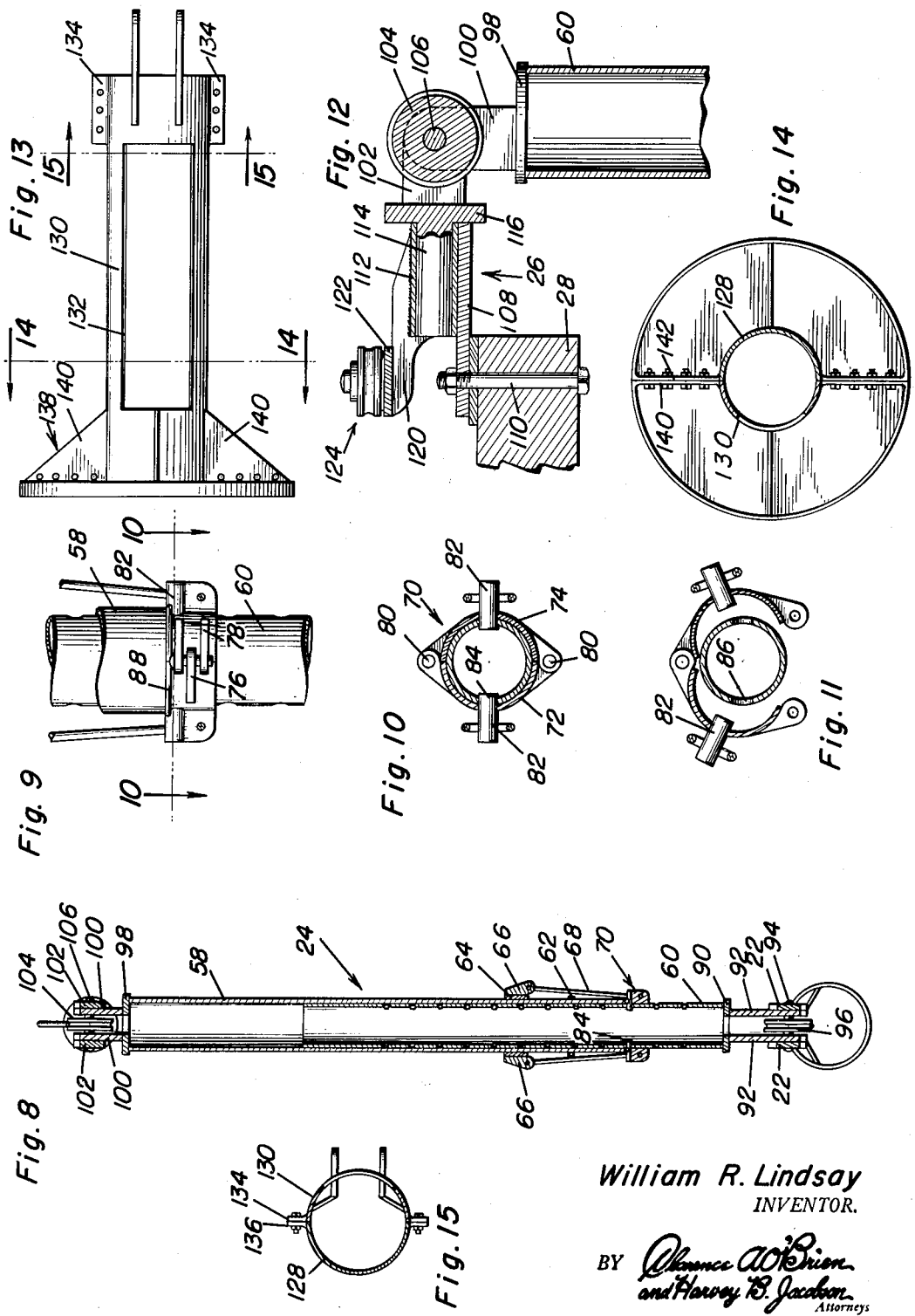

United States Patent Office 2,731,233
Patented Jan. 17, 1956

2,731,233

PIPE PULLER

William R. Lindsay, Madisonville, Ky.

Application May 29, 1953, Serial No. 358,341

6 Claims. (Cl. 254—29)

This invention relates generally to equipment for pulling pipes and pertains more particularly to a novel and improved form of such mechanism.

A primary object of this invention is to provide a simple, economical and yet effective pipe puller composed of a minimum number of parts, the same being easily manipulated for pipe pulling operations.

Another object of this invention is to provide a pipe puller assembly which in conjunction with a support to which it is attached forms a rigid and effective pipe pulling assembly.

Another object of this invention is to provide a pipe puller in conformity with the foregoing objects which is adjustable for pulling pipe buried at various depths.

Another object of this invention is to provide a pipe puller assembly which comprises essentially a base portion and a support portion pivotally secured thereto so that the puller assembly may be actuated in many convenient positions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a vertical section through a portion of ground containing a buried pipe and showing the puller and associated vehicle in operation;

Figure 2 is a top plan view of a portion of the puller assembly showing details of its construction on an enlarged scale;

Figure 3 is a plan view of the base member;

Figure 4 is an end view of the puller shown in Figure 3;

Figure 5 is a transverse section taken substantially along the plane of section line 5—5 of Figure 3;

Figure 6 is a longitudinal section taken substantially along the plane of section line 6—6 of Figure 3;

Figure 7 is a perspective view showing the connection between the base and the support member;

Figure 8 is a vertical section taken along the plane of section line 8—8 in Figure 1 showing details of the internal construction of the support assembly;

Figure 9 is an enlarged view of a portion of the support assembly, portions thereof being broken away;

Figure 10 is a horizontal section taken substantially along the plane of section line 10—10 of Figure 9 showing the manner of connecting the component parts of the support assembly;

Figure 11 is a view similar to Figure 10 but showing the parts in disengaged position;

Figure 12 is a section taken substantially along the plane of section line 12—12 of Figure 2 showing details of the pulley bracket assembly on an enlarged scale;

Figure 13 is a plan view of a modified form of base member;

Figure 14 is a transverse section taken substantially along the plane of section line 14—14 of Figure 13 showing details of the modified base member; and Figure 15 is a transverse section taken substantially along the plane of section line 15—15 of Figure 13 showing details of the pivot end of the modified form of base assembly.

Referring now more particularly to Figure 1, reference numeral 10 indicates generally a trench dug in the ground and which extends below the hole 12 within which a buried pipe 14 is disposed. It will of course be appreciated that the hereinafter described assembly pertains most particularly to the problem of removing buried pipes beneath the surface of structures which for some reason or another should not be disturbed for the purpose of removing pipes. This problem is most frequently encountered in conjunction with streets, sidewalks, walls and the like, but it will be readily appreciated that the hereinafter described assembly may be utilized in conjunction with buried pipe no matter where it is disposed.

The essential features of the invention includes the base assembly indicated generally by the reference character 16 which includes the bearing plate assembly indicated generally by the reference character 18 which is adapted to abut against the surface or face 20 of the trench in surrounding relation to the buried pipe 14. The other end of the base member is provided with a pair of bracket ears 22 by means of which the lower end of the supporting assembly indicated generally by the reference character 24 is pivotally secured. The upper end of the supporting assembly is pivotally secured to the bracket assembly 26 which is rigidly secured to a suitable support which in this instance is shown as the bed 28 of a truck, the truck having a winch assembly 30 thereon. Cable 32 is operatively connected to the winch assembly 30 and is trained over the various pulleys hereinafter described which form a part of the puller assembly and the free end of the cable is suitably attached as indicated by the reference character 34 to the buried pipe 14. As will be soon apparent, the support assembly 24 is extendable so that the base member 16 may be positioned at various adjusted points below the surface of the ground to perform pulling operations on pipes buried at various depths. A suitable platform 36 may be erected for the purpose of supporting the wheels 38 of the truck to position the puller in the most advantageous position, but it will be realized that this platform is herein shown only for the purpose of illustration since the provision of this platform depends upon the type of vehicle used and can be eliminated as desired. In this respect, it is to be noted that the supporting assembly 24 need not necessarily be disposed in the perpendicular relation with the base assembly 16 as shown in Figure 1, it being possible to dispose this supporting assembly at various angular positions relative thereto.

While pulling the pipe, it will be appreciated that the free end of the cable 32 is attached to the buried pipe adjacent the flange 18 of the base assembly and actuation of the winch 30 will pull this pipe from its hole until the free end of the cable reaches the end of the base assembly adjacent the support assembly 24 wherein the cable is removed and once again attached to the pipe adjacent the flange assembly 18. Also, during pulling operation of one pipe for the purpose of removal, the opposite end thereof may be provided with a suitable cable 40 attached thereto in any desired manner so that when the buried pipe is removed, the cable will be in position for attachment to the cable 32 so that a new length of pipe may be pulled into the old hole 12.

Referring now more particularly to Figures 3–6, it will be seen that the base assembly comprises an elongated tubular member 42 to one end of which the annular base plate 44 is secured, this base plate being provided with the peripheral flange or rim 46 and associated reinforcing web 48 to form the previously mentioned bearing flange assembly 18. The tubular member 42 is provided with a cut-away portion 50 which extends substantially throughout its entire length so that an operator of the puller assembly may readily manipulate the cable 32 within the tubular base member for removing and attaching the cable to the buried pipe to be pulled. To prevent collapse of the tubular base member due to this cut-away portion, the bridge assembly 52 is provided and includes the leg member 54 secured to the surface of the tubular member at opposite sides of the cut-away portion and interconnected by means of the cross piece 56, the effect of this bridge assembly being to prevent spreading apart of the opposed edges forming the cut-away portion when compressive forces are imparted thereto during pulling operation. The free end of the tubular base member is provided with the previously described bracket ears 22.

Referring now more particularly to Figures 8–11, it will be seen that the supporting assembly 24 comprises a pair of telescopically engaged tubular members 58 and 60, the outer of which 58 is provided at its lower end with the stop ring 62 for a purpose presently apparent. A collar 64 is slidably received on this outer member and is provided with radially extending ears 66 which are apertured to receive the fastening rings 68, these rings carrying the adjustment assembly 70 at their lower ends. As seen most clearly in Figures 10 and 11, the adjustment assembly comprises a pair of semi-circular brackets 72 and 74, the former of which is provided with the diametrically opposed single ears 76 and the latter of which is provided with the diametrically opposed pairs of ears 78, all ears being apertured and receiving pin members 80. A retaining pin 82 is disposed at an intermediate point on each of the ears and these pins are disposed in diametrically disposed radially extending position with their inner ends 84 projecting inwardly of the ears so as to be received in one of the pairs of diametrically opposed apertures 86 which are disposed substantially throughout the longitudinal length of the inner member 60. The upper end of the adjustment assembly 70 is provided with the bumper ring 88 serving as an abutment between the two members 58 and 60 when compressing forces are exerted thereon during pulling operation of a pipe.

It will of course be apparent that the over-all length of the assembly 24 may be varied by merely removing one of the pivot pins 80 in the fastening assembly 70 and spreading the two ears apart in the manner shown in Figure 11 whereby the assembly 24 may be adjusted to the desired length and the ears and their associated pins replaced in the position as shown in Figure 10 for maintaining the adjusted length. During transportation or at any time when compressive forces are not exerted upon the assembly 24 by means of the previously described cable 32, the collar 64 may engage against the stop ring 62 to prevent disengagement between the two tubular members 58 and 60.

The lower end of the inner member 60 is provided with an annular plate 90 from which the ears 92 depend, these ears being apertured and received between the ears 22 on the base assembly 16. A pivot pin 94 extends through the registered apertures in the ears 22 and 92 the pulley 96 being journaled on this pin and disposed between the ears 22. At the upper end of the outer member 58, a similar construction of the cover plate 98 and ears 100 is provided, these latter ears being received between the ears 102 on the bracket assembly 26 and a further pulley 104 being disposed between the ears 100 and journaled on the pin 106 which pivotally secures the upper end of the supporting assembly 24 to the bracket assembly 26.

Referring now more particularly to Figures 2 and 12, it will be seen that the bracket assembly 26 includes the plate 108 suitably apertured to receive fastening elements 110 for securing one end of the same to the previously described bed 28 of the truck or vehicle with which it is associated, the upper surface of this plate being provided with the sleeve 112 rigidly secured thereto which receives the shank 114 of a pivot yoke assembly. This pivot yoke assembly is also provided with a thrust collar portion 116 on one end of the shank 114 from which the previously described ears 102 extend. A pair of spaced brackets 118 are rigidly secured at opposite sides to the sleeve 112 and their outer or free ends 120 are interconnected by means of the cross plate 122 upon which the pulley assemblies 124 are vertically pivoted as by the pin members 126.

To recapitulate, the base assembly 16 is disposed in proper position with relation to the pipe to be pulled and in some instances, it will be apparent that the bridge assembly 52 thereof will permit the base assembly to be lowered by means of a hoist or the like. The support assembly 24 is adjusted to the proper length and is pivotally connected to the base assembly 16 the supporting assembly 24 being disposed angularly with respect to the assembly 16 in a position to afford the most convenient positioning of the vehicle. The upper end of the supporting assembly 24 is of course pivotally secured to the yoke which forms a part of the bracket assembly 26 and it will be manifest that the pivotal relationship between the yoke and the remainder of the bracket assembly obviates the necessity of providing accurate vertical alignment between the bracket assembly and the base assembly 16. The cable 32 is of course trained between the pulley members 124, over the pulley 104 and through the supporting assembly 24 and thence over the pulley 96 to be attached at its free end to the pipe to be pulled. These various assemblies, in conjunction with the vehicle to which they are attached form a constrained linkage assembly so that when tension is applied to the cable 32 it will be applied directly to the pipe to be pulled without distortion or shifting of the various assemblies comprising the pipe puller.

Referring now more particularly to Figures 13–15, wherein a modified form of base assembly is shown, it will be seen that the main body portion thereof comprises a pair of semi-circular members 128 and 130, the latter of which is provided with the hand opening 132 and both of which are provided with diametrically opposed flange portions 134 and 136 by means of which the two semi-circular members are removably secured together. The bearing portion 138 of this base member is provided with mating reinforcing web portions 140 and 142 removably secured together by suitable fastening elements.

The purpose of this modified form of base assembly is to enable the same to be positioned upon any intermediate point of a portion of a pipe to be pulled without sliding the same all the way along from the free end of the pipe. This assembly is also useful where the pipe is provided with obstructions such as valves or the like which would not permit proper positioning of the base assembly. Also, removal of the base assembly is most easily effected, even when the free end of the pipe which has been pulled is so close to an obstruction that the base assembly could not be slid therefrom.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A pipe puller comprising a base member of elongated tubular configuration adapted to be placed in concentric relation with a pipe to be pulled, a support member pivotally secured at one end to an end of said base member, the other end of said support member being adapted to be secured to a stationary member, pulleys carried by said base member and said support member, and a cable trained over said pulleys, said support member including a pair of telescopically engaged tubular members, means for securing said tubular members in various intended positions, said means including a pair of semi-circular brackets removably interconnected at their opposite ends and disposed in embracing relation to one of said telescopically engaged members, each semi-circular bracket having a radially inwardly projecting pin for selective disposition within certain of a series of longitudinally spaced apertures in said one member.

2. A pipe puller comprising a base member of elongated tubular configuration adapted to be placed in concentric relation with a pipe to be pulled, a support member pivotally secured at one end to an end of said base member, the other end of said support member being adapted to be secured to a stationery member, pulleys carried by said base member and said support member, and a cable trained over said pulleys, said support member including a pair of telescopically engaged tubular members, means for securing said tubular members in various intended positions, said telescopically engaged members consisting of inner and outer tubular members, said inner member having a series of longitudinally spaced apertures therein, said means including a stop ring secured to the lower end of said outer member, a collar slidably received on said outer member and engageable with said stop ring, an adjustment assembly including pins selectively engageable within said apertures, said adjustment assembly forming an abutment between said inner and outer members and articulated means for connecting said collar with said adjustment assembly.

3. A pipe puller comprising an elongated tubular base member having an annular flange at one end, an extensible support assembly, a pivot pin extending through the other end of said base member and an end of said support assembly, a pulley journalled on said pivot pin, a bracket, a second pivot pin extending through the other end of said support assembly and said bracket, and a second pulley journaled on said second pivot pin, said bracket including a pair of guide pulleys arranged in side by side relation, the pivot axes of said guide pulleys lying in a plane parallel to the axis of said second pulley, said bracket having first and second separable portions, said first portion carrying said second pulley, and said second portion carrying said guide pulleys.

4. The combination of claim 3 wherein said first and second portions are pivotally interconnected along an axis perpendicular to the axis of said second pulley and said plane containing the axes of said guide pulleys.

5. A pipe puller comprising an elongated tubular base member having an annular flange at one end, an extensible support assembly including a pair of telescopically engaged members, a pivot pin extending through the other end of said base member and an end of one of said telescopically engaged members, a pulley rotatably received on said pivot pin, a bracket, a second pivot pin extending through said bracket and an end of the other of said telescopically engaged members, a pulley journalled on said second pivot pin, and means for securing said telescopically engaged members in various extended positions, said means including a pair of semi-circular brackets removably interconnected at their opposite ends and disposed in embracing relation to one of said telescopically engaged members, each semi-circular bracket having a radially inwardly projecting pin for selective disposition within certain of a series of longitudinally spaced apertures in said one member.

6. A pipe puller comprising an elongated tubular base member having an annular flange at one end, an extensible support assembly including a pair of telescopically engaged members, a pivot pin extending through the other end of said base member and an end of one of said telescopically engaged members, a pulley rotatably received on said pivot pin, a bracket, a second pivot pin extending through said bracket and an end of the other of said telescopically engaged members, a pulley journalled on said second pivot pin, and means for securing said telescopically engaged members in various extended positions, said telescopically engaged members comprising inner and outer tubular members, said inner member having a series of longitudinally spaced apertures therein, said means including a stop ring secured to the lower end of said outer member, a collar slidably received on said outer member and engageable with said stop ring, an adjustment assembly including pins selectively engageable within said apertures, said adjustment assembly forming an abutment between said inner and outer members, and articulated means for connecting said collar with said adjustment assembly.

References Cited in the file of this patent

UNITED STATES PATENTS

| 1,727,566 | Schlesinger | Sept. 10, 1929 |
| 1,809,342 | Johnson | June 9, 1931 |
| 1,865,113 | Kiesel | June 28, 1932 |
| 2,286,781 | Abramson et al. | June 16, 1942 |
| 2,529,292 | Greenfield | Nov. 7, 1950 |

FOREIGN PATENTS

| 432,265 | Germany | Aug. 3, 1926 |